United States Patent [19]

Von Röpenack et al.

[11] Patent Number: 5,453,253
[45] Date of Patent: Sep. 26, 1995

[54] METHOD OF REPROCESSING JAROSITE-CONTAINING RESIDUES

[75] Inventors: Adolf Von Röpenack; Winfried Böhmer, both of Datteln; Heiner Grimm, Oer-Erkenschwick, all of Germany

[73] Assignee: Ruhr-Zink GmbH, Datteln, Germany

[21] Appl. No.: 602,017

[22] Filed: Oct. 23, 1990

[30] Foreign Application Priority Data

Oct. 24, 1989 [DE] Germany .................. 39 35 362.1

[51] Int. Cl.⁶ .................................. C01B 17/02
[52] U.S. Cl. .............. 423/138; 423/150.6; 423/150.1; 423/110; 423/567.1; 204/119; 204/112; 204/114
[58] Field of Search .............. 423/99, 101, 106, 423/109, 110, 138, 150, 166, 158, 146, 150.6, 150.1, 567.1; 75/725; 204/119, 112, 114

[56] References Cited

U.S. PATENT DOCUMENTS

| | | | |
|---|---|---|---|
| 4,063,933 | 12/1977 | Peters | 423/109 |
| 4,305,914 | 12/1981 | Pammenter et al. | 423/109 |
| 4,355,005 | 10/1982 | Rastas et al. | 423/109 |
| 4,440,569 | 4/1984 | Weir et al. | 423/109 |
| 4,443,253 | 4/1984 | Weir et al. . | |
| 4,505,744 | 3/1985 | Weir et al. . | |
| 4,510,028 | 4/1985 | Bolton et al. | 423/109 |
| 4,610,721 | 9/1986 | Duyvesteyn et al. | 423/109 |
| 4,778,520 | 10/1988 | Spink et al. | 423/109 |
| 4,832,925 | 5/1989 | Weir et al. . | |

OTHER PUBLICATIONS

Dr. Michael Koch, *Productivity and Technology in the Metallurgical Industries*, 1989, pp. 587–589.
Adolf von Ropenack, 1989, *Ruckstandsfreie hydrometallurgische Zinkgewinnung durch das Hamatitverfahren*, in *Erzmetall* 42, 1989, pp. 125–129 Abstract Only.

*Primary Examiner*—R. Bruce Breneman
*Attorney, Agent, or Firm*—Sprung Horn Kramer & Woods

[57] ABSTRACT

For reprocessing of jarosite-containing residues to provide usable products, the jarosite-containing residues and concentrates which contain zinc sulfide are stirred in dilute sulfuric acid, which contains 40 to 100 g/l free sulfuric acid, in an autoclave under an oxygen partial pressure of at least 1,000 kPa and at a temperature from 130° to 170° C., the iron contents and the zinc contents of the residue and of the concentrate which contains zinc sulfide are substantially dissolved, flashing is effected and is succeeded by a separation of solution and solids, the solution is fed to the leaching circuit of a plant for the electrolytic production of zinc with precipitation of iron as hematite, the elemental sulfur is separated from the solids and the hematite residue is supplied to a further utilization.

7 Claims, No Drawings

METHOD OF REPROCESSING JAROSITE-CONTAINING RESIDUES

DESCRIPTION

This invention relates to a method of reprocessing jarosite-containing residues, which are treated in a sulfuric acid medium at an elevated temperature and under a superatmospheric pressure.

In the hydrometallurgical recovery of zinc from zinc concentrates the iron which is contained in the zinc concentrates and/or in the roasted blende is dissolved in the several leaching stages. Most of the iron contained in the roasted blende consists of zinc ferrite ($ZnFe_2O_4$). That compound is usually dissolved by a hot acid leaching step for a recovery of the zinc contained in the compound. The solution obtained by hot acid leaching usually contains 10 to 30 g/l iron and between 70 and 100 g/l zinc. The dissolved iron must be removed from the zinc solution before the electrolytic production of zinc. In most plants for the electrolytic production of zinc, iron is separated from the solution as jarosite $MeFe_3(OH)_6(SO_4)_2$, wherein Me may consist of Na, K, Pb, Ag, $NH_4$ or $H_3O$. Only in a few plants for the electrolytic production of zinc, iron is separated as hematite $Fe_2O_3$ or as goethite $\alpha$-FeO(OH).

Whereas the precipitation of jarosite can be effected simply and at low cost, it involves great ecological problems. The jarosite formed in zinc production usually contains only 25 to 30% iron and corresponding contents of sulfate, alkali, lead and/or other compounds. For this reason the jarosite cannot be used as a raw material for iron and must be dumped. In a plant for the electrolytic production of 120,000 metric tons of zinc per year, about 100,000 metric tons of jarosite become available per year as sludge and must be stored in basins which are sealed against the ground water or in other means. Because the jarosite contains Pb and Cd from the zinc concentrates, it pollutes the environment. As the jarosite will always contain water-soluble salts, mainly zinc sulfate, it is also deleterious to the ground water. The separation of iron as goethite will not solve the disposal problem but in that case a somewhat smaller quantity of sludge must be dumped because goethite contains about 40 to 43% iron, i.e., more than jarosite. Only when the iron is precipitated by the hematite process will iron be separated as an iron oxide which contains about 60% Fe and may be used, e.g., in the cement industry or, after a further purification, as a raw material in the steelmaking industry so that residue need not be dumped.

Various attempts have been made to reprocess the jarosite which has become available in the hydrometallurgical recovery of zinc or previously dumped jarosite sludges in order to recover higher iron-containing compounds which can be used in other industries.

For instance, it is known to convert jarosite to hematite by a thermal treatment at temperatures above 700° C. (Metallurgical Transactions B, Vol. 10 B, September 1979, pages 439 to 446). $SO_2$ is released in that case and the non-ferrous metals contained in the jarosite remain in the hematite. That process involves a high energy demand owing to the high temperature which is required.

From metallurgical Transactions B, Vol. 10 B, September 1979, pages 439 to 446, it is also known that ammonium jarosite in an aqueous solution can be converted to hematite and ammonium sulfate at temperatures above 50° C. if $NH_3$ is added and that a filterable crystalline hematite will be produced at a temperature above 100° C. The ammonium sulfate can be recovered from the solution by crystallization. The lead contained in the jarosite will be incorporated in the hematite. Because the zinc contained in the hematite is dissolved, the solution must be reprocessed. For the formation of ammonium jarosite, less ammonia is required than for the conversion of the jarosite to hematite so that only a part of the ammonium sulfate which becomes available can be recycled for the precipitation of jarosite. That process is highly expensive owing to the high consumption of ammonia and the high energy requirement for the crystallization of the ammonium sulfate. Besides, that process has been described only for the reaction of pure ammonium jarosite, which will virtually not be formed by the precipitation of jarosite, and has not been described for a conversion of mixed jarosites and of alkali jarosites.

From German Patent Publication 24 02 768 it is known that jarosite can be suspended in a weakly acid medium and can be converted to hematite at temperatures from 220° to 250° C. in an autoclave. In that case there will be no departure from the range in which hematite is stable in the system $Fe_2O_3$—$SO_3$—$H_2O$. Because the jarosite which becomes available in the hydrometallurgical production of zinc is usually not pure but contains impurities, such as lead sulfate, gypsum, silica compounds, etc., in considerable amounts, the hematite thus produced does not have a quality which would permit its further processing in other industries. Besides, autoclaves are required which are designed to withstand the high temperatures and pressures.

It is an object of the invention to reprocess jarosite-containing residues with the highest possible economy and with a production of a residue which can directly be supplied for further utilization and need not be dumped.

That object is accomplished in accordance with the invention in that the jarosite-containing residues and concentrates which contain zinc sulfide are stirred in dilute sulfuric acid, which contains 40 to 100 g/l free sulfuric acid, in an autoclave under an oxygen partial pressure of at least 1,000 kPa and at a temperature from 130° to 170° C., the iron contents and the zinc contents of the residue and of the concentrate which contains zinc sulfide are substantially dissolved, flashing is effected and is succeeded by a separation of solution and solids, the solution is fed to the leeching circuit of a plant for the electrolytic production of zinc with precipitation of iron as hematite, the elemental sulfur is separated from the solids and the hematite residue is supplied to a further utilization.

Concentrates which contain zinc sulfide consist of zinc blende concentrates, sulfide-containing zinc-lead concentrates, and mixtures of said two concentrates.

The content of free sulfuric acid in the dilute sulfuric acid is stated as the content of free sulfuric acid after the end of the reaction. A higher initial content of free sulfuric acid is selected in dependence on the consumption of sulfuric acid during the reaction. The final content of free sulfuric acid is adjusted to be so high that in the equilibrium diagram for the system $Fe_2O_3$—$SO_3$—$H_2O$ said content is outside the range in which iron compounds are stable in solution. The conditions in the system $Fe_2O_3$—$SO_3$—$H_2O$ are apparent from TMS Paper Selection, Paper No. A73-11, and from the figures of German patent Publication 24 0 768. The total pressure in the autoclave is composed of the water vapor pressure that corresponds to the temperature and of the oxygen partial pressure. The solution which is available after the flashing and the separation of undissolved solids contains the zinc and the iron and is fed to the leaching circuit of a plant for the electrolytic production of zinc with precipitation of iron as hematite. Such plant for the electrolytic production of zinc is described in Published German Patent Application 36 34 359. From the undissolved residue obtained by the pressure leaching, elemental sulfur is separated, e.g., by flotation. The remaining residue consists essentially of insoluble constituents of the concentrate which contains zinc sulfide and of the jarosite-containing residues; such insoluble constituents may consist, e.g., of lead, silver, silica, etc. That so-called lead-silver residue may be delivered to the lead industry for further utilization. The jarosite-containing residues and the concentrates which contain zinc sulfate are preferably suspended in spent electrolyte from the plant for the electrolytic production of zinc and the suspension is fed to the autoclave. The solution which is available after the pressure leaching contains, e.g., 80 to 120 g/l zinc, 15 to 30 g/l iron, mainly as trivalent iron, and other dissolved constituents of the starting materials. Such dissolved constituents of the starting materials may consist, e.g., of copper, cadmium, manganese, magnesium and alkalies. When that solution has been fed to the leaching circuit of the plant for the electrolytic production of zinc, zinc blende concentrate or sulfur dioxide are added to that solution in known manner in a reducing stage in order to reduce the trivalent iron to bivalent iron. When the residue left after the reduction with zinc blende concentrate has been removed, roasted zinc blende or zinc oxides is or are added to the solution in a neutralization stage in order to decrease the content of free sulfuric acid. When the neutralization has been removed, the solution is treated in known manner to precipitate hematite. This is effected in the autoclave at temperatures from 180° to 200° C. in an oxidizing atmosphere and results in a precipitation of iron as hematite that contains about 58 to 60% Fe. The hematite is removed and dewatered and is supplied to a further use, optionally after a further purification stage.

In accordance with a preferred feature the mixing ratio of jarosite-containing residues to concentrate which contains zinc sulfide is between 1:10 and 1:1. In that range good results will be produced and a flexible use of the jarosite-containing residue will be permitted.

In accordance with a preferred feature the dilute sulfuric acid contains 50 to 80 g/l free sulfuric acid. Particularly good results will be obtained by processing in that range.

In accordance with a preferred feature the oxygen partial pressure in the autoclave is from 1,100 to 1,300 kPa. Very good yields are obtained in that range.

In accordance with a preferred feature the treating time in the autoclave is from 30 to 180 minutes. At higher pressures and temperatures in the autoclave the treating time will be in the lower portion of that range and it will be in the upper portion of that range at lower temperatures and pressures. That treating time will result in good yields.

In accordance with a preferred feature the temperature in the autoclave is from 145° to 155° C. That temperature range will result in good yields in conjunction with relatively low energy and equipment expenditures.

In accordance with a preferred feature the solution which is available after the flashing and separation is fed to the leaching circuit of the plant for the electrolytic production of zinc at a point succeeding the hot acid leaching. In a plant for the electrolytic production of zinc in which zinc blende concentrate is roasted and the roasted product is leached and in which zinc blende concentrate is also leached under pressure, particularly good conditions and economically favorable results will be obtained if the solution obtained by the pressure leaching is fed at that point.

EXAMPLES

The jarosite and the concentrates which contain zinc sulfide were mixed 3.5 liters of spent electrolyte from a plant for the electrolytic production of zinc.

The spent electrolyte from zinc electrolysis had the following composition: 55 g/l Zn 0.01 g/l Fe 0.09 g/l K 0.6 g/l Na 198 g/l free $H_2SO_4$.

The suspension was fed to a 5-liter laboratory autoclave. The solids were maintained in suspension by stirring at 2,000 r.p.m. Oxygen was introduced into the suspension. An oxygen partial pressure of 1,100 kPa was maintained during the reaction. The suspension was heated to 150° C. and was held at that temperature for 1.5 hours. The suspension was then cooled to 80° C., and the solids were separated from the solution by filtration and were then washed and dried.

EXAMPLE 1

800 g jarosite (dry weight) composed of 28.9% Fe 6.5% Zn 3.7% Pb 1.7% $Al_2O_3$ 4.6% $SiO_2$ 0.3% Cu 0.1% Cd 0.14% Na 0.6% K 1.4% $NH_3$ 10.5% S were used without an addition of concentrate that contains zinc sulfide.

The solids obtained after the pressure leaching was composed of 26.4% Fe 2.2% Zn 6.3% Pb 1.6% $Al_2O_3$ 6.6% $SiO_2$ 0.1% Cu 0.2% Cd.

The solution obtained after the pressure leaching was composed of 67 g/l Zn 30.3 g/l Fe 1.9 g/l $Al_2O_3$ 0.4 g/l $SiO_2$ 0.5 g/l Cu 0.1 g/l Cd 95 g/l free $H2SO_4$.

Only 45% of the iron content of the jarosite were dissolved by the autoclaving. On the other hand, 80% of the zinc were dissolved, which is not firmly bound in the jarosite but is present as zinc sulfate from adhering mother liquor or in the form of other compounds, most of which are acid-soluble.

EXAMPLE 2

The feed consisted of a mixture of 110 g jarosite (dry weight) having the composition stated in Example 1 and 450 g of a low-iron and low-lead zinc blende concentrate composed of 61.5% Zn 1.9% Fe 0.7% Pb 0.2% $Al_2O_3$ 0.8% $SiO_2$ <0.10% Cu 0.11% Cd 0.01% Na 0.04% K 33.2% sulfide sulfur The solids obtained after the pressure leaching were composed of 4.0% Zn 0.8% Fe 4.5% Pb 0.4% $Al_2O_3$ 4.3% $SiO_2$ <0.1% Cu 0.1% Cd 65.1% elemental sulfur.

The solution obtained after the pressure leaching was composed of 134 g/l Zn 9.8 g/l $Fe^{3+}$ 1.3 g/l $Fe^{2+}$ 0.6 g/l $Al_2O_3$ 0.2 g/l $SiO_2$ 0.5 g/l Na 0.14 g/l K 0.08 g/l Cu 0.1 g/l Cd 74 g/l $H_2SO_4$.

Contrary to Example 1, almost all iron from the concentrate and from the jarosite had been dissolved, as is apparent from the following balance:

| | |
|---|---|
| Fe fed in concentrate | 8.6 g |
| Fe fed in jarosite | 31.8 g |
| total feed | 40.4 g |
| Fe recovered in residue | 1.4 g = 3.5% |
| Fe recovered in solution | 39.0 g = 96.5% |
| | 40.4 g |

The zinc recovery in the solution amounted to 97%.

The experiment of Example 2 was repeated with different quantitative proportions.

179 g jarosite and 417 g zinc blende concentrate (dry weight in each case) were used.

The solids obtained after the pressure: leaching were composed of 5.0% Zn 0.6% Fe 5.9% Pb 0.2% $Al_2O_3$ 6.4% $SiO_2$ <0.1% Cu 0.2% Cd 56.2% elemental sulfur The solution obtained after the pressure leaching was composed of 128 g/l Zn 15.3 g/l $Fe^{3+}$ 1.3 g/l $Fe^{2+}$ 0.9 g/l $Al_2O_3$ 0.2 g/l $SiO_2$ 69 g/l $H_2SO_4$.

In that experiment, too, more than 95% of the iron and of the zinc were dissolved.

EXAMPLE 4

The experiment of Example 2 was repeated with different quantitative proportions.

The feed consisted of 298 g jarosite and 346 g zinc blende concentrate (dry weight in each case).

The solids obtained after the pressure leaching were composed of 4.8% Zn 1.3% Fe 7.2% Pb 0.1% $Al_2O_3$ 8.7% $SiO_2$ <0.1% Cu 0.1% Cd 41.7% elementary sulfur The solution obtained after the pressure leaching was composed of 118 g/l Zn 23.4 g/l $Fe^{3+}$ 1.8 g/l $Fe^{2+}$ 1.2 g/l $Al_2O_3$ 0.1 g/l $SiO_2$ 69 g/l $H_2SO_4$.

The mixture which was fed in that experiment contained 46% jarosite. More than 95% of the iron and of the zinc were dissolved.

EXAMPLE 5

A jarosite having the composition stated in Example 1 was mixed with a zinc blende concentrate which had higher iron and lead contents.

The zinc blende concentrate was composed of 49.1% Zn 9.1% Fe 2.4% Pb 0.7% $Al_2O_3$ 3.0% $SiO_2$ 0.09% Cu 0.14Cd 0.04% Na 0.07% K 30.5% sulfide sulfur Most of the iron contained in the concentrate was pyrite.

The feed consisted of a mixture of 110 g jarosite (dry weight) and 450 g zinc blende concentrate (dry weight).

The solids obtained after the pressure leaching were composed of 4.1% Zn 2.1% Fe 8.1% Pb 1.2% $Al_2O_3$ 9.1% $SiO_2$ <0.1 % Cu 0.1% Cd 58.0% elementary S.

The solution obtained after the pressure leaching was composed of 117 g/l Zn 18.2 g/l $Fe^{3+}$ 1.5 g/l $Fe^{2+}$ 0.8 g/l $Al_2O_3$ 0.2 g/l $SiO_2$ 0.7 g/l Na 0.16 g/l K 0.2 g/l Cu 0.16 g/l Cd 71 g/l $H_2SO_4$.

A substantial conversion of the jarosite was also possible in the presence of that zinc blende concentrate. A total of 95% of the iron and 97% of the zinc contained in the jarosite and concentrate in the feed were dissolved.

EXAMPLE 6

The feed consisted of a mixture of 362 g jarosite (dry weight) and 311 g zinc blende concentrate (dry weight) composed as in Example 5.

The solids obtained after the pressure leaching were composed of 5.9% Zn 11.3% Fe 9.4% Pb 0.8% $Al_2O_3$ 9.6% $SiO_2$ <0.1% Cu 0.3% Cd 35.5% elemental S.

The solution obtained after the pressure leaching was composed of 102 g/l Zn 30.0 g/l $Fe^{3+}$ 0.6 g/l $Fe^{2+}$ 1.5 g/l $Al_2O_3$ 0.2 g/l $SiO_2$ 64 g/l $H_2SO_4$.

In that experiment the amount of zinc blende concentrate was apparently not sufficient (the blend contained 54% jarosite and 46% zinc blende concentrate) for a complete conversion of the jarosite. 81% of the total amount of iron in the feed were dissolved and 19% were left in the residue. 93% of the zinc contents of the jarosite and of the concentrate were dissolved.

EXAMPLE 7

The feed consisted of a mixture of 110 g jarosite (dry weight) having the composition stated in Example 1 and 450 g (dry weight) of a mixed zinc-lead concentrate composed of 30.8% Zn 15.4% Fe 12.5% Pb 0.8% $Al_2O_3$ 4.2% $SiO_2$ 0.35% Cu 0.06% Cd 0.02% Na 0.09% K 25.2% sulfide sulfur.

The solids obtained after the pressure leaching were composed of 1.9% Zn 3.7% Fe 26.4% Pb 1.2% $Al_2O_3$ 9.6% $SiO_2$ 0.1 Cu <0.1% Cd 35.4% elemental sulfur.

The solution obtained after the pressure leaching was composed of 97 g/l Zn 25.1 g/l $Fe^{3+}$ 1.4 g/l $Fe^{2+}$ 0.8 g/l $Al_2O_3$ 0.2 g/l $SiO_2$ 0.8 g/l Na 0.2 g/l K 0.5 g/l Cu 0.12 g/l Ca 78 g/l $H_2SO_4$.

The fact that jarosite can be converted also in the presence of a mixed zinc-lead concentrate is apparent from the following balance of the amounts of iron:

| | |
|---|---|
| Fe fed in concentrate | 69.3 g |
| Fe fed in jarosite | 31.8 g |
| total feed | 101.1 g |
| Fe recovered in residue | 8.4 g = 8.3% |
| Fe recovered in solution | 92.7 g = 91.7% |
| | 101.1 g |

The zinc recovery in the solution amounted to 97%.

EXAMPLE 8

The feed consisted of a mixture of 110 g jarosite (dry weight) having the composition stated in Example 1, 110 g (dry weight) of a mixed zinc-lead concentrate having the composition stated in Example 7, and 340 g (dry weight) of a zinc blende concentrate composed of 49.1% Zn 9.1% Fe 2.4% Pb 0.7% $Al_2O_3$ 3.0% $SiO_2$ 0.09% Cu 0.14Cd 0.04% Na 0.07% K 30.5% sulfide sulfur.

The solids obtained after the pressure leaching were composed of 3.3% Zn 2.5% Fe 13.7% Pb 1.1% $Al_2O_3$ 9.9% $SiO_2$ <0.1% Cu 0.1% Cd 51.9% elemental sulfur.

The solution obtained after the pressure leaching was composed of 112 g/l Zn 20.1 g/l $Fe^{3+}$ 1.2 g/l $Fe^{2+}$ 0.8 g/l $Al_2O_3$ 0.2 g/l $SiO_2$ 82 g/l $H_2SO_4$.

| Iron balance: | |
|---|---|
| Fe fed in zinc blende concentrate | 30.9 g |
| Fe fed in mixed Zn—Pb concentrate | 16.9 g |
| Fe fed in jarosite | 31.8 g |
| Total feed | 79.6 g |
| Fe recovered in residue | 4.8 g = 6.0% |
| Fe recovered in solution | 74.8 g = 94.0% |
| | 79.6 g |

The zinc recovery in the solution amounted to 97%.

The advantages afforded by the invention reside in that jarosite-containing residues can be reprocessed with a relatively low energy expenditure and without an additional added apparatus expenditure or with only a low additional apparatus expenditure if an existing plant is available which serves for the electrolytic production of zinc using hematite process and comprises means for direct leaching of concentrates which contain zinc sulfide. Whereas it is not possible under the usual conditions for the precipitation of hematite to convert jarosite sludges in the autoclave used for the precipitation of hematite from zinc-iron sulfate solutions, the processing in accordance with the invention will effect a conversion to a substantial degree at lower temperatures and pressures. The jarosite-containing residues are converted to a product which can be used further and which, if necessary, can readily be dumped.

It will be understood that the specification and examples are illustrative but not limitative of the present invention and that other embodiments within the spirit and scope of the invention will suggest themselves to those skilled in the art.

What is claimed is:

1. A method of reprocessing a jarosite-containing residue, which comprises reacting a jarosite-containing residue and a concentrate which contains zinc sulfide in dilute sulfuric acid under an oxygen partial pressure of at least 1000 kPa and at a temperature from 130° to 170° C. to dissolve the iron and zinc contents of said jarosite-containing residue and concentrate which contains zinc sulfide, the sulfuric acid concentration of said dilute sulfuric acid being such that after reaction there results a suspension containing 40 to 100 g/l free sulfuric acid, flashing the suspension, separating the suspension into solution and solids, feeding the solution to a leaching circuit of a plant for electrolytic production of zinc with precipitation of hematite, and separating elemental sulfur from said solids.

2. The method according to claim 1, wherein the mixing ratio of jarosite-containing residue to zinc sulfide-containing concentrate is between 1:10 to 1:1.

3. The method according to claim 1, wherein the dilute sulfuric acid contains 50 to 80 g/l free sulfuric acid.

4. The method according to claim 1, wherein the oxygen partial pressure in the reaction is from 1,100 to 1,300 kPa.

5. The method according to claim 1, wherein the treating time in the reaction is from 30 to 180 minutes.

6. The method according to claim 1, wherein the temperature in the reaction is from 145° to 155° C.

7. The method according to claim 1, wherein the leaching circuit of the plant for the electrolytic production of zinc includes hot acid leaching, the solution which is available after the flashing and separation being fed to the leaching circuit at a point downstream of the hot acid leaching.

* * * * *